(12) United States Patent
Mitra et al.

(10) Patent No.: US 8,937,957 B2
(45) Date of Patent: Jan. 20, 2015

(54) INTELLIGENT MEDIA GATEWAY SELECTION FOR MULTIMEDIA COMMUNICATION SESSIONS

(75) Inventors: Debasis Mitra, Summit, NJ (US); Iraj Saniee, New Providence, NJ (US); Anwar I. Walid, Watchung, NJ (US); Indra Widjaja, Florham Park, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2090 days.

(21) Appl. No.: 11/351,367

(22) Filed: Feb. 10, 2006

(65) Prior Publication Data

US 2007/0189268 A1 Aug. 16, 2007

(51) Int. Cl.
*H04L 12/28* (2006.01)
*H04L 29/06* (2006.01)

(52) U.S. Cl.
CPC ........ *H04L 29/06027* (2013.01); *H04L 65/104* (2013.01); *H04L 65/80* (2013.01); *H04L 65/103* (2013.01)
USPC ............. 370/395.5; 370/395.21; 370/395.31; 370/401

(58) Field of Classification Search
USPC .................... 370/401, 352, 351, 353, 395.21, 370/395.31, 395.5, 395.52
See application file for complete search history.

(56) References Cited

U.S. PATENT DOCUMENTS

| | | | |
|---|---|---|---|
| 5,867,494 A * | 2/1999 | Krishnaswamy et al. .... | 370/352 |
| 6,157,636 A * | 12/2000 | Voit et al. ...................... | 370/353 |
| 6,157,648 A * | 12/2000 | Voit et al. ...................... | 370/401 |
| 6,366,576 B1 * | 4/2002 | Haga .............................. | 370/352 |
| 6,529,499 B1 | 3/2003 | Doshi et al. ................... | 370/352 |
| 6,829,221 B1 * | 12/2004 | Winckles et al. .............. | 370/238 |
| 6,873,616 B1 * | 3/2005 | Fedyk et al. ................... | 370/357 |
| 6,912,216 B1 * | 6/2005 | Smith et al. ................... | 370/352 |
| 7,133,922 B1 * | 11/2006 | She et al. ...................... | 709/231 |
| 7,145,898 B1 * | 12/2006 | Elliott ........................... | 370/352 |
| 7,145,900 B2 * | 12/2006 | Nix et al. ...................... | 370/352 |
| 7,151,770 B1 * | 12/2006 | Clark ............................. | 370/352 |
| 7,257,109 B2 * | 8/2007 | Sylvain ......................... | 370/352 |

(Continued)

FOREIGN PATENT DOCUMENTS

| | | |
|---|---|---|
| EP | 1309149 B1 | 6/2010 |
| WO | WO 2004/102919 A | 11/2004 |

(Continued)

OTHER PUBLICATIONS

"Routing Solution for VoIP Calls in Large-scale IP MM Networks", IEEE Melecon 2004, May 12-15, 2004; Basic, Vizek, Bolt, Naglic, Filipovic-Juric, and Njezic.*

(Continued)

*Primary Examiner* — Benjamin H Elliott, IV
(74) *Attorney, Agent, or Firm* — Hitt Gaines, PC

(57) ABSTRACT

A method of operating a packet network includes the step of selecting one of a plurality of candidate gateways to connect a multimedia communication session between the packet network and a TDM network. The packet network has a source node of the multimedia communication session, and the TDM network has a destination of the multimedia communication session. The candidate gateways interconnect the packet network and the TDM network. The selecting step includes comparing end-to-end congestions for bearer traffic between the source node and different candidate gateways of the plurality.

20 Claims, 8 Drawing Sheets

(56) References Cited

U.S. PATENT DOCUMENTS

| | | | |
|---|---|---|---|
| 7,283,518 B2 * | 10/2007 | Vikberg et al. | 370/352 |
| 7,620,687 B2 * | 11/2009 | Chen et al. | 709/205 |
| 2003/0016395 A1 | 1/2003 | Kajiwara | |
| 2003/0112788 A1 * | 6/2003 | Erhart et al. | 370/345 |
| 2003/0128819 A1 * | 7/2003 | Lee et al. | 379/88.13 |
| 2004/0114570 A1 * | 6/2004 | Vikberg et al. | 370/351 |
| 2004/0196867 A1 * | 10/2004 | Ejzak et al. | 370/468 |
| 2005/0101303 A1 * | 5/2005 | Pelaez et al. | 455/413 |
| 2005/0135340 A1 | 6/2005 | Lee et al. | 370/352 |
| 2005/0195795 A1 * | 9/2005 | Aoki et al. | 370/351 |
| 2005/0226258 A1 * | 10/2005 | Chischportich et al. | 370/401 |
| 2006/0227706 A1 * | 10/2006 | Burst | 370/229 |
| 2006/0251050 A1 * | 11/2006 | Karlsson | 370/352 |
| 2007/0091921 A1 * | 4/2007 | Elliot et al. | 370/468 |
| 2007/0189268 A1 * | 8/2007 | Mitra et al. | 370/352 |
| 2009/0268615 A1 * | 10/2009 | Pelletier | 370/241 |
| 2013/0101295 A1 | 4/2013 | Dupuis | |

FOREIGN PATENT DOCUMENTS

| | | |
|---|---|---|
| WO | 2006011929 A2 | 2/2006 |
| WO | 2007/003449 | 7/2007 |

OTHER PUBLICATIONS

"Session Border Control in IMS", Data Connection Unlimited, www.dataconnection.com, Sep. 2005; Jonathan Cumming.*

Mitzenmacher, M., "The Power of Two Choices in Randomized Load Balancing," IEEE Transactions on Parallel and Distrubuted Systems, vol. 12, No. 10, pp. 1094-1104, (Oct. 2001).

Foreign Communication From a Related Counterpart Application, Japanese Application No. 2008-554367, Japanese Office Action dated Aug. 7, 2014, 4 pages.

Ezaki, T., et al., "Path Establishing Method on AR-CAC," The Institute of Electronics, Information and Communication Engineers (IEIEC), Proceedings of the 2004, IEICE Communications Society Conference, Japan, Sep. 8, 2004, p. 93.

Minami, Y., et al., "A Proposal of Node Selection Based on Proximity for Peer-to-Peer File Sharing Systems," Information Processing Society of Japan, vol. 2002, No. 11, Feb. 7, 2002, pp. 3-9.

* cited by examiner

FIG. 2

ROUTING TABLE

| | | |
|---|---|---|
| SOURCE NODE 1 | MGW-1 | END-TO-END CONGESTION |
| SOURCE NODE 1 | MGW-2 | END-TO-END CONGESTION |
| ⋮ | ⋮ | ⋮ |
| SOURCE NODE 1 | MGW-N | END-TO-END CONGESTION |
| SOURCE NODE 2 | MGW-1 | END-TO-END CONGESTION |
| ⋮ | ⋮ | ⋮ |
| SOURCE NODE 2 | MGW-N | END-TO-END CONGESTION |
| ⋮ | | |

INTELLIGENT MEDIA GATEWAY SELECTION FOR MULTIMEDIA COMMUNICATION SESSIONS

BACKGROUND

1. Technical Field

The invention relates generally to packet networks and more specifically to packet networks that support multimedia communication sessions with time-division multiplexed (TDM) networks.

2. Discussion of Related Art

The implementation of a multimedia service such as voice over Internet Protocol (VoIP) may provide both capital and operations savings to service providers (SPs) by enabling convergence with data services. While implementing a basic VoIP service may be simple, the implementation of a VoIP service with the quality, reliability, security and scalability of conventional telephony may be a challenge. Indeed, a carrier-grade VoIP may have requirements at various layers of the packet network. Desirable requirements include user authentication at the service layer, voice quality in bursty traffic at the data layer, and dynamic responses to network outages at the control layer. In addition, these properties are desirable in the presence of multiple vendors and a heterogeneous access technology.

The interface between the packet network and the Public Switched Telephone Network (PSTN) will probably be an important technical issue during development of a carrier-grade VoIP. This interface desirably will provide for efficient, reliable, and scalable inter-operation of hybrid VoIP and circuit-switched networks, e.g., PSTNs. In such a hybrid network, the IP Multimedia Subsystem (IMS) architecture may be able to provide admission control, routing, and quality of service (QoS) assurances. The IMS architecture is being developed and standardized by $3^{rd}$ Generation Partnership Project (3GPP) and $3^{rd}$ Generation Partnership Project 2 (3GPP2).

In the IMS architecture, one or more core packet networks connect to access networks via standardized interfaces. Due to the standardized interfaces, the core networks may be able to provide seamless communications between heterogeneous access technologies such as Ethernet, Cable, DSL, $3^{rd}$ generation (3G) Cellular, and WiFi. In the IMS architecture, the core packet network supports the session initiation protocol (SIP).

An IMS architecture may include functional components that assign media gateways to support multimedia communication sessions between a TDM network, e.g., a PSTN, and the core packet network. These functional components may, e.g., be border gateway control functions (BGCFs). A BGCF determines the routing of a multimedia communication session, e.g., a VoIP call, between the core packet network and a destination TDM network through the assignment of a media gateway (MGW) to the multimedia communication session. The BGCF may use a routing table to determine the appropriate MGW for connecting a multimedia communication session to a destination TDM network.

SUMMARY

Some network architectures use a Border Gateway Control Function (BGCF) to statically determine the routing of multimedia communication sessions, e.g., voice over IP (VoIP) calls, through media gateways (MGWs). These BGCFs are typically not optimized for dynamic and bursty traffic conditions due to their reliance on static routing tables. In contrast, intelligent BGCFs can compensate for changes in link states and traffic loads at MGWs. Some embodiments of intelligent BGCFs dynamically assign MGWs to requested multimedia communication sessions based on end-to-end congestions for bearer traffic between the source nodes of the sessions and the MGWs serving the destination TDM networks of the sessions. Such dynamical routing methods can increase numbers of multimedia communication sessions that can be connected to the destination TDM network.

One embodiment features a method of operating a portion of a packet network. The method includes the step of selecting one of a plurality of candidate gateways to connect a multimedia communication session between the packet network and a TDM network. The packet network has a source node of the multimedia communication session, and the TDM network has a destination of the multimedia communication session. The candidate gateways interconnect the packet network and the TDM network. The selecting step includes comparing end-to-end congestions for bearer traffic between the source node and different candidate gateways of the plurality.

Another embodiment features a method for operating a portion of a packet network that supports an IP media subsystem (IMS). The method includes selecting one of a plurality of candidate media gateways to connect a multimedia communication session between a packet network and a time-division multiplexed network. The packet network has a source node for the multimedia communication session, e.g., a VoIP call, and supports the IP multimedia subsystem. The time-division multiplexed network has a destination of the multimedia communication session. Individual ones of the candidate media gateways interconnect the packet network and the time-division multiplexed network. The step of selecting includes comparing an end-to-end congestion for bearer packet traffic between the source node and a first of the candidate gateways and an end-to-end congestion for bearer packet traffic between the source node and a second of the candidate gateways.

Various embodiments include data storage media encoded with a program of instructions in machine executable form. The instructions provide a method of operating a packet network to perform the steps of one of the methods and/or processes described herein. For example, the instructions may be encoded to perform the selecting step of the above-described methods for operating portions of packet networks.

Another embodiment features a server or router having a data storage medium storing a machine executable program of instructions to perform steps of a method. The steps include selecting one of a plurality of candidate media gateways to connect a requested VoIP call between a packet network and a time-division multiplexed network. The packet network has a source node for the VoIP call. The time-division multiplexed network has a destination of the VoIP call. The candidate media gateways interconnect the packet network and the time-division multiplexed network. The steps for selecting include comparing end-to-end congestions for bearer traffic between the source node and first and second of the candidate gateways of the plurality. The server or router is located in the packet network and supports SIP.

BRIEF DESCRIPTION OF THE DRAWINGS

The illustrative embodiments are described more fully by the Figures and the Detailed Description of the Illustrative Embodiments. The inventions may, however, be embodied in various forms and are not limited to embodiments described in the Figures and Detailed Description of the Illustrative Embodiments.

FIG. 2 illustrates a portion of a routing table that may be used to make admission and routing decisions in response to requests to set up some multimedia communication sessions (MCSs), e.g., within the network of FIG. 1;

DETAILED DESCRIPTION OF ILLUSTRATIVE MBODIMENTS

Figure 1:
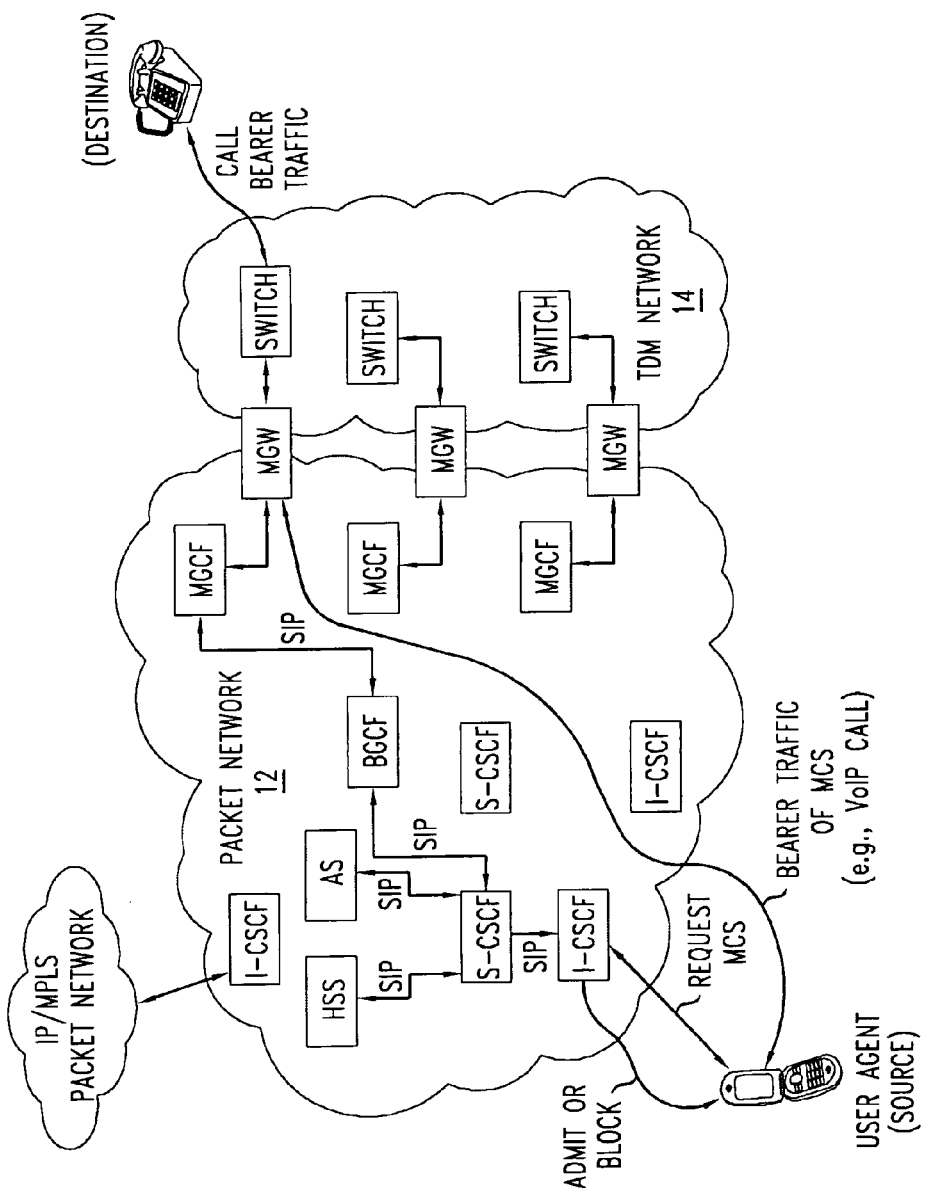
FIG. 1 is a block diagram schematically illustrating an IMS architecture over an Internet (IP) or multiprotocol label switching (MPLS) core packet network.

FIG. 1 schematically illustrates an exemplary Internet Protocol (IP) and/or a Multiprotocol Label Switching (MPLS) core packet network 12 that has an IMS architecture. The IMS architecture includes various functional components that may be involved in setting up multimedia communication sessions (MCSs) between the core packet network 12 and a TDM network 14, e.g., a PSTN. The various functional components of the IMS architecture interact by transmitting session initiation protocol messages (SIP) as schematically indicated by lines in FIG. 1. The functional components of the IMS architecture may, e.g., be machine executable programs of instructions and/or data structures that are stored and operated on servers and/or routers of the core data network 12.

The core packet network 12 also includes a plurality of IP addresses or MPLS labels for media gateways (MGWs). The MGWs provide connectivity for bearer traffic (i.e., indicated by a thick line) between source nodes of the core packet network 12 and the TDM network 14. In particular, each MGW provides for inter-conversion between the IP and/or MPLS protocol of bearer traffic in the core packet network 12, e.g., and the real-time transport protocol (RTP) traffic of the bearer traffic in the TDM network 14, e.g., the ISDN/ISUP protocol traffic of a PSTN. The bearer traffic supports, e.g., the multimedia communications. Exemplary multimedia communications include VoIP calls, audio communications, facsimile transmissions, image communications, low-resolution video communications, etc.

Herein, each IP port address or MPLS port label of a media gateway (MGW) that can transfer bearer traffic between the core packet network 12 and the TDM network 14 will be referred to as a media gateway (MGW). Each port has a corresponding bearer traffic load and an associated end-to-end congestion for handling bearer traffic to/from the various source nodes of the core packet network 12. Such separate ports of a MGW have their own load and congestion properties.

Herein, the end-to-end QoS between two addresses of a packet network may be evaluated from various measurable properties. The properties are representative of end-to-end congestion for packet bearer traffic between the two addresses. Examples of such measurable properties include the end-to-end packet delay for transmissions between the two addresses, the roundtrip packet delay for transmissions between the two addresses, the packet loss rate for transmissions between the two addresses, the packet delay jitter for transmissions between the two addresses, and averages of any of the above measurable properties. An increase in any of these properties provides an indication of an increase in the end-to-end congestion for bearer traffic between the two addresses. Herein, operations based on an end-to-end congestion may be based on the value of any such properties.

In the IMS architecture, several SIP-enabled functional components may be involved in the admission and routing of a MCS through the core packet network 12. These components may include an interrogating call session control function (I-CSCF), one or more service call session control functions (S-CSCFs), a home subscriber server (HSS), a border gateway control function (BGCF), and one or more media gateway control functions (MGCFs).

Each I-CSCF forms a logical interface that is responsible for interfacing external entities with the IMS architecture. Exemplary external entities include user agents, access networks, and other core packet networks. The I-CSCF is, e.g., responsible for admission and routing decisions in response to requests to set up MCSs. The I-CSCF may send SIP message(s) associated with such requests to a S-CSCF. The I-CSCF and/or S-CSCF determine the appropriate IMS functionality for making admission and routing decisions and send SIP message(s) to those functionalities.

The I-CSCF and/or S-CSCF may consult one or more network databases via the IMS architecture to obtain help in making SIP routing decisions or taking actions. The databases may include, e.g., a home subscriber server (HSS), which typically stores user information, e.g., S-CSCF identities for various external entities.

The I-CSCF and/or S-CSCF may also consult one or more application servers (ASs) to obtain help in making SIP routing decisions or taking actions. The ASs can provide special services, e.g., a service for modifying a VoIP call routing.

If the requested MCS has a destination in the TDM network 14, the relevant I-CSCF or S-CSCF hands off the session-level responsibility for admission and routing decisions to a BGCF. In particular, the BGCF decides whether to admit the MCS and may select a candidate MGW to provide connectivity between the core packet network 12 and the TDM network 14 for the MCS's bearer traffic. Herein, candidate MGW refers to a MGW that interconnects a packet network having a source of a requested MCS and a TDM network having a destination of the requested MCS. Indeed, the BGCFs determine the routing of admitting MCSs by selecting one end point, i.e., MGWs, for bearer traffic of such MCSs in the core packet network 12.

After selecting a MGW, the BGCF hands control of the requested MCS to the media gateway control function (MGCF) that is responsible for the selected MGW. The MGCF provides signaling inter-working between the SIP protocol of the IMS architecture and the protocol of the TDM network 14 and also controls the selected MGW. Once the destination IP address of a MGW is selected, the path through the IMS network is not controlled by BGCF. Indeed, the underlying core packet network topology may be invisible to the BGCF. Such invisibility may result, because one set of organizations owns the IP transport layer, and a different set of organizations owns the IMS architecture.

While a request to set up a MCS with a destination in the TDM network 14 will trigger an appropriate BGCF to make decisions related to selecting and assigning a MGW, a MCS whose source is in the TDM network 14 will not typically invoke a BGCF to perform the selection of the MGW for the MCS.

Some IMS architectures make static assignments of MGWs to source nodes of the core packet network. One type of static assignment involves assigning the same preselected MGW to all MCSs having a give source and a destination in a given TDM network. In such cases, a BGCF sends a SIP message to block requested MCSs whenever the preselected MGW is unavailable. An alternate type of static assignment involves selecting MGWs from a preselected list. A BGCF will search the list sequentially to find a MGW for a requested MCS. The BGCF assigns the first available MGW on the list to the requested MCS and decides to block the requested MCS if no MGW on the list is available.

In heavy traffic conditions, such static assignments of MGWs to source nodes can produce an inefficient handling of MCSs for multiple reasons. First, the static assignments cause requests for MCSs to be blocked whenever the assigned one or more MGWs experience(s) large loads. That is, all requested MCSs from a particular source node will be blocked under such conditions even when the packet network has other MGWs that are able to provide connectivity for the requested MCSs. Second, such static assignments of MGWs have tendencies to over use some MGWs and to under use other MGWs, e.g., when a preselected list is used to select MGWs.

Due to one or more of the inefficiencies in static MCS routing methods, dynamic MCS routing methods are proposed. Below, various embodiments provide dynamic methods for admitting and routing MCSs requested between source nodes in a packet network and destinations in a TDM network.

In the IMS architecture of FIG. 1, the BGCFs select MGWs for connecting requested MCSs based on the end-to-end congestions for bearer traffic between the source nodes and individual candidate MGWs. For that reason, the BGCFs may be referred to as intelligent BGCFs. As should be clear from the above description, there are a variety of measurable properties indicative of the end-to-end congestion for bearer traffic between the source nodes and individual candidate MGWs. These measurements include, e.g., recently measured values of any of: the end-to-end packet delay, the end-to-end roundtrip packet delay, the end-to-end packet loss rate, the end-to-end packet delay jitter, and averages of measured values of any of these properties.

The embodiments cover methods and apparatus based on any such measurable properties that are representative of the end-to-end congestions for bearer traffic. As an example measurements of the end-to-end path congestions may be made dynamically by actively probing paths in the core packet network 12 or may be made passively through the accumulation data with a management system of the core packet network 12. In the former case, the IP ping feature may, e.g., be used to obtain the end-to-end path delays and/or another measure of end-to-end congestion for bearer traffic between a source node and a candidate MGWs. In the later case, simple network management protocol (SNMP) measurements may be collected from individual elements of the core packet network 12 to thereby obtain low frequency measurements of the end-to-end congestions for bearer traffic.

Figure 10:
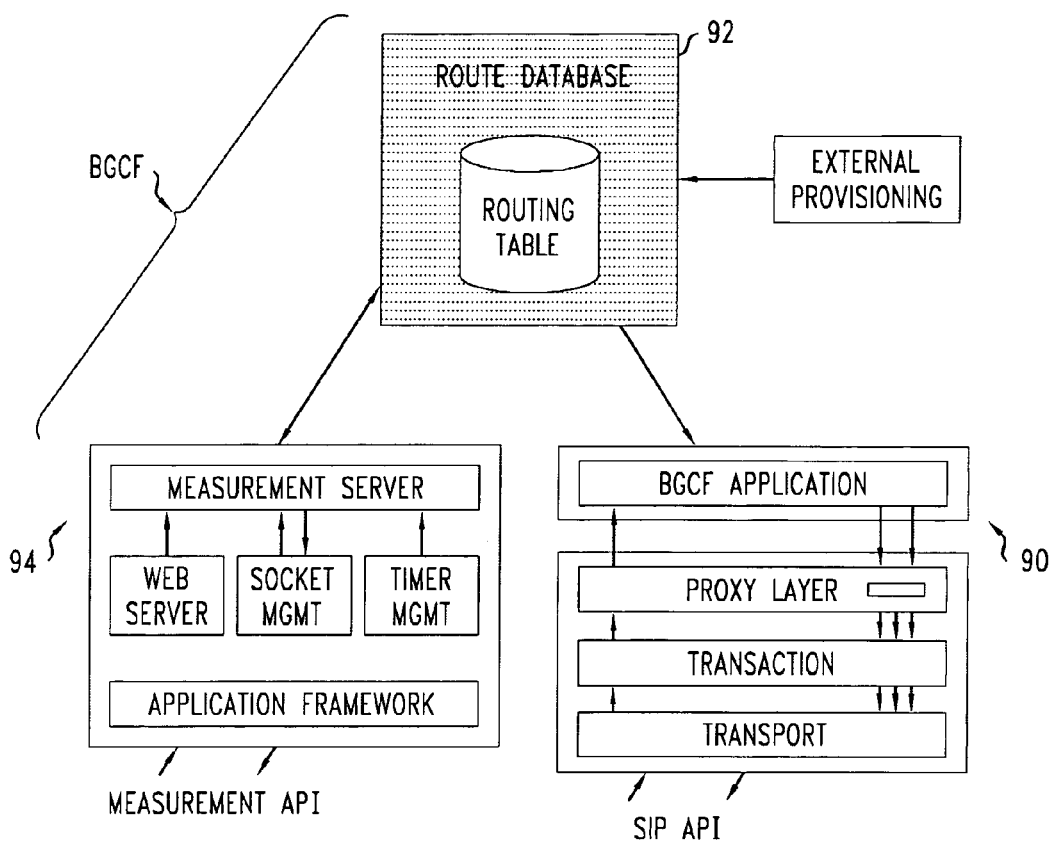
FIG. 10 is a block diagram illustrating an exemplary configuration for the intelligent BGCFs of FIGS. 1 and 3B.

FIG. 2 illustrates an exemplary routing table 16 that may be used to maintain measurements representative of end-to-end path congestions in the core data network 12 of FIG. 1 or averages of such measurements. The routing table 16 has individual entries 18 labeled by a pair that includes a source node, i.e., a router or server, and a MGW, i.e., MGW-1 to MGW-N. Each entry 18 also stores the selected measurement that is representative of an end-to-end congestion or an average of a measured end-to-end congestions between the source node and MGW of the pair. The routing table 16 may be stored on the same server or router as the BGCF, e.g., as shown in FIG. 10, or may be stored elsewhere in the core data network 12. The individual entries 18 of the routing table 16 may be updated regularly, irregularly, or in response to specified events, e.g., the receipt or processing of a request to set up a new MCS.

Figure 3A:
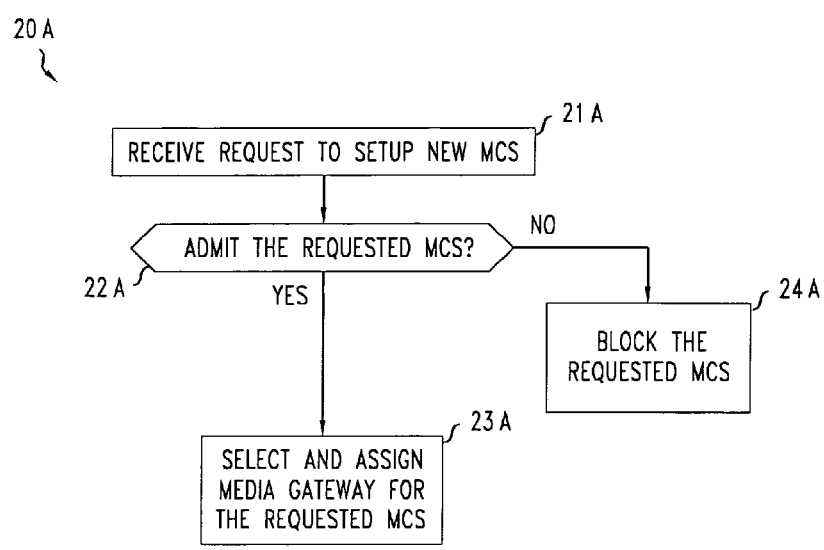
FIG. 3A is a flow chart illustrating a method for making admission and routing decisions responsive to requests to set up MCSs between a packet network and a TDM network.

FIG. 3A illustrates a method 20A of processing a request to set up a MCS between a source node of a packet network and a destination address of a TDM network. In various embodiments, the requested multimedia communications may be VoIP calls, image communications, facsimile transmissions, low-resolution video communications, and/or other types of multimedia communications.

The method 20A includes receiving at the source node of the packet network a request to setup a new MCS (step 21A). The request is, e.g., received either from a user agent connected directly to the source node or from another packet network that connects the actual originator of the request to the receiving source node.

The method 20A includes selecting and assigning one media gateway to serve as the connection between the packet and TDM networks for the requested MCS (step 23A). The assigned media gateway will convert and transfer the MCS's bearer traffic data between the two networks. The media gateway is selected from a set of candidate media gateways that interconnect the source packet network and the destination TDM network. The step of selecting includes comparing end-to-end congestions for bearer traffic between the source node and different individual candidate gateways, e.g., by comparing measurements representative of end-to-end congestions that are stored in routing table 16 of FIG. 2. The selection step may including using the comparison to identify a proper subset of the candidate gateways whose end-to-end congestions are lowest and then, selecting the media gateway to assign to the requested MCS from the proper subset. The assignment of the selected media gateway enables said gateway to process the bearer traffic of the MCS.

In some embodiments, the step of selecting the media gateway also includes considering the QoSs available from various candidate media gateways. For example, the step of selecting may include identifying those media gateways whose end-to-end congestions for bearer traffic with the source node are low enough to ensure a pre-required QoS level for the requested type of MCS and then, choosing one of those identified media gateways to provide the inter-network connection for the requested MCS.

The method 20A optionally includes determining whether to admit or block the requested MCS prior to performing the selection of the media gateway to provide network interconnectivity for the requested MCS (step 22A). The decision to admit or block is based on the availability of candidate media gateways and optionally on quality of service (QoS) considerations. In some embodiments, the availability of a circuit of a media gateway for the new MCS is sufficient to cause the requested MCS to be admitted. In this embodiment, if no media gateway is found to have an available circuit for the requested MCS, the method 20A includes blocking the requested MCS (step 24A). In other embodiments, the available QoS also plays a role in the decision of whether to admit or block the requested MCS. In those embodiments, a decision to admit the requested MCS requires finding that, at least, one media gateway is able to provide a QoS adequate for type of MCS being requested. The QoS value may be measured through any of the above-described properties that are representative of the end-to-end congestion, e.g., one-way or roundtrip end-to-end packet delay between the source node and the media gateway, the packet loss rate between the source node and the media gateway, the accumulated packet delay jitter between the source node and the media gateway, and averages thereof. If the measurable property selected to represent the end-to-end congestion has a value below a threshold preselected for the requested MCS, the associated media gateway provides an adequate QoS. In this embodiment, if no media gateway is found to have both an available circuit for the requested MCS and the ability to provide an adequate QoS, the method 20A includes blocking the requested MCS (step 24A).

Figure 3B:
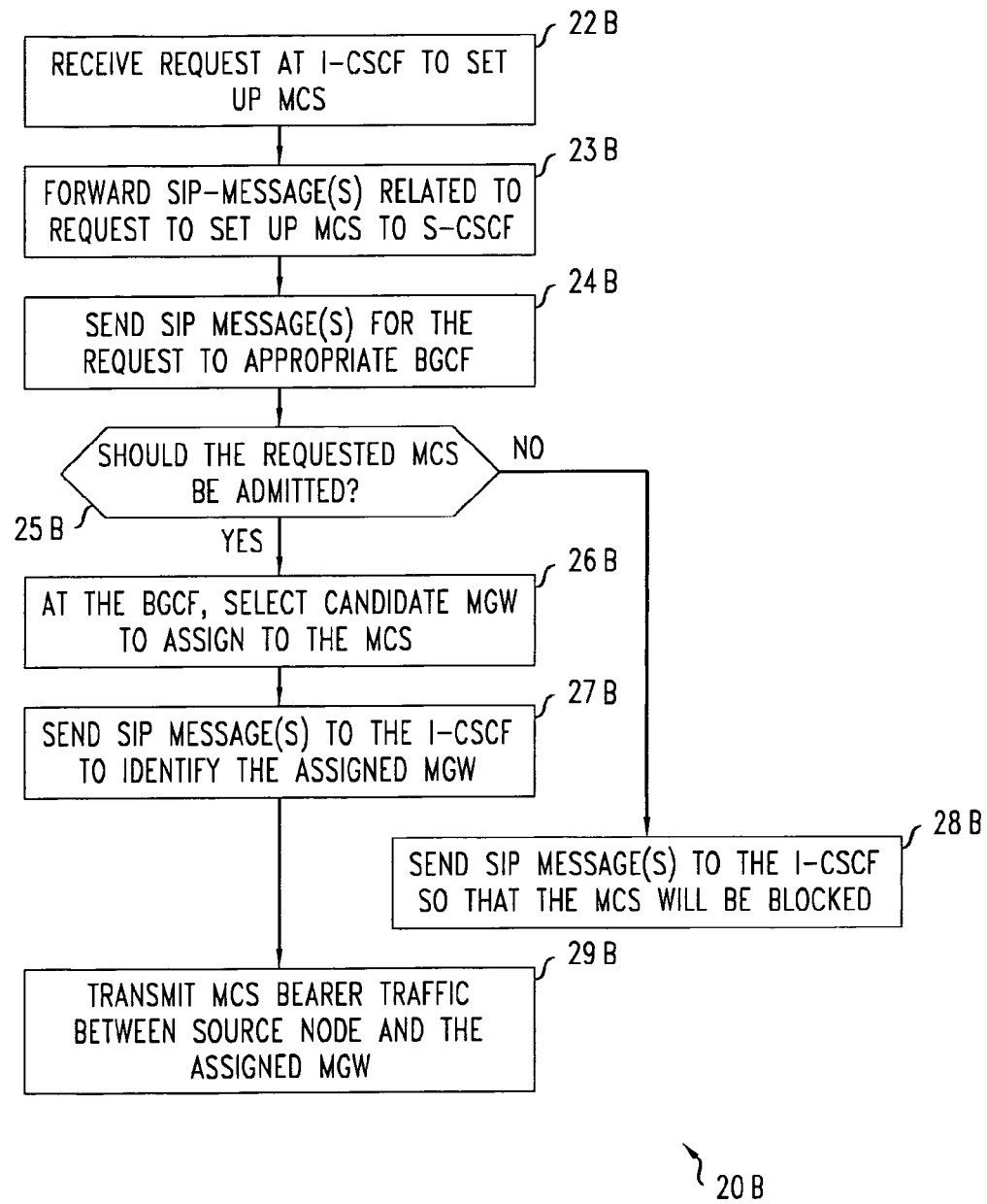
FIG. 3B is a flow chart illustrating a specific embodiment of the method of FIG. 3A, wherein the packet network supports an IMS architecture, e.g., as in the core packet network of FIG. 1.

FIG. 3B illustrates a specific embodiment 20B of the method 20A of FIG. 3A in which the packet network has an IMS architecture and supports an IP and/or MPLS protocol. The TDM network may support a ISDN/ISUP protocol and may be, e.g., a PSTN. In particular, the source node of the requested MCS is in the core packet network 12 of FIG. 1, and the destination address of the requested MCS is in the TDM network 14 of FIG. 1.

The method 20B includes receiving a request to set up a new MCS at an I-CSCF, wherein the MCS will have a source node, i.e., a router or server, in the packet network 12 (step 22B). The method 20B may include forwarding SIP message(s) related to the received request from the I-CSCF to a S-CSCF designated by said I-CSCF (step 23B). The method 20B includes sending SIP message(s) for the requested MCS from the S-CSCF or I-CSCF to an appropriate intelligent BGCF in response to determining that the MCS has a destination in a TDM network (step 24B). The appropriate intelligent BGCF makes end-point routing decisions, i.e., selections of MGWs, for the destination TDM network of the requested MCS. In alternate embodiments, the intelligent BGCF may be replaced by a set of intelligent MGCFs, wherein each intelligent MGCF of the set controls and can select only a proper subset of the candidate MGWs for the destination TDM network. Herein, a candidate MGW is a MGW that connects a packet network having a source node of a MCS to a TDM network having a destination of the MCS. At the BGCF, the method 20B may optionally include deciding whether to admit or block the requested MCS (step 25B). In some embodiments, the BGCF will decide to block the requested MCS only if none of the candidate MGWs is available to support the requested MCS. In other embodiments, the BGCF will decide to block the requested MCS when either no candidate MGW is available or no available candidate MGW is able to provide the QoS needed for the requested type of MCS. For example, an inadequate QoS occurs when end-to-end congestions for bearer traffic are too high between the source node and each candidate MGW.

In response to admitting the requested MCS, the method 20B includes having the BGCF select one MGW from the set of candidate MGWs (step 26B). The selected MGW is assigned to support the new MCS thereby effectively acting as the second IP and/or MPLS end-point for the requested MCS. The assigned MGW will provide the interconnectivity between the packet network 12 and the TDM network 14 for the bearer traffic of the requested MCS. The admission and selection decisions of steps 25B, 26B are based on dynamically updated measurements of end-to-end congestions for bearer traffic between the source node and individual ones of the candidate MGWs. Steps 25B and 26B may include interrogating a routing table, e.g., routing table 16 of FIG. 2, to obtain measurements representative of these end-to-end congestions. In response to assigning a MGW, the method 20B includes sending SIP message(s) to the I-CSCF to identify the assigned MGW to the source node (step 27B). The message(s) may, e.g., come from the BGCF or from the MGCF that controls the assigned MGW, and the identification includes, e.g., the IP address or MPLS label of the assigned MGW. In response to deciding to block the requested MCS, the method 20B includes sending a SIP message from the BGCF to the I-CSCF to request that the MCS be blocked (step 28B). If the requested MCS is admitted, the source node will subsequently transmit bearer traffic for the MCS to the assigned MGW (29B).

In different embodiments, the method 20B involves selecting the MGW that will be assigned to the requested MCS according to different dynamical processes. Examples of these dynamical processes are illustrated in FIGS. 4-8. In these dynamical processes, the end-to-end congestion for bearer traffic between two addresses may refer to the end-to-end packet delay, the roundtrip packet delay, the packet loss rate, or the packet delay jitter for transmissions between the two addresses or may refer to averages of any of these measurable properties.

Figure 4:
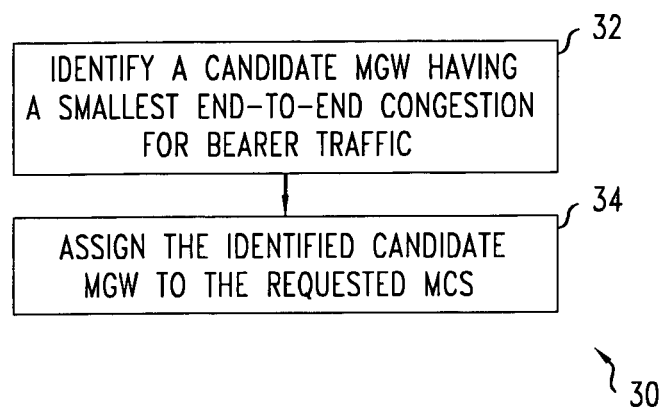
FIG. 4 is a flow chart illustrating a dynamical MCS routing process that tends to equalize end-to-end congestions for bearer traffic between a source node and a set of candidate MGWs.

Referring to FIG. 4, a first process 30 selects MGWs in a manner that tends to reduce extreme differences between the end-to-end congestions of the candidate MGWs. In particular, the process 30 includes searching a routing table, e.g., routing table 16 of FIG. 2, to identify the candidate MGW for which bearer traffic with the source node of the requested MCS should have the smallest end-to-end congestion (step 32). The process 30 also includes assigning the identified candidate MGW to provide the inter-network connectivity for the bearer traffic of requested MCS (step 34).

Assigning the requested MCS to the identified MGW will tend to reduce the range of the end-to-end congestions among the candidate MGWs provided that the entries of the routing table are not too stale. If the entries of the routing table are stale, the process 30 may even increase the range of the end-to-end congestions among the candidate MGWs. Indeed, the process 30 will select the same MGW for each new MCS request from a given source node until the routing table is updated. Thus, in embodiments based on the process 30, the routing table should probably be updated frequently so that the selected MGW is not over loaded with all new requests to set up MCSs from the source node.

Figure 5:
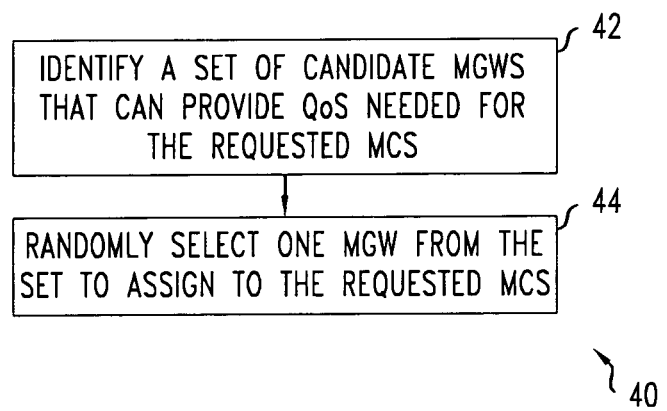
FIG. 5 is a flow chart illustrating a dynamical MCS routing process that tends to equalize end-to-end congestions for bearer traffic between a source node and a subset of candidate MGWs that can maintain a suitable quality of service (QoS)

Referring to FIG. 5, a second process 40 for selecting a MGW for the requested MCS is based on QoS constraints.

The process 40 includes searching the routing table that provides one or more measured properties representative of end-to-end congestions to identify a preselected number of candidate MGWs that are able to provide the QoS needed for the requested type of MCS (step 42). In step 42, the preselected number may be two so that two MGWs are identified; the preselected number may also be a larger integer than two. Step 42 thins out the set of candidate MGWs by removing those whose end-to-end congestions are too large for the needed QoS. In particular, step 42 does not identify candidate MGWs associated with end-to-end congestions above a preselected threshold for the type of MCS requested.

The process 40 also includes selecting one MGW from the set of identified candidate MGWs via a random selection process (step 44). The selected MGW is assigned to the provide connectivity between the packet network 12 and the TDM network 14 for bearer traffic of the requested MCS. Any of a variety of algorithms for pseudo-randomly choosing one object from a collection of a fixed number of objects may be used to make the random selection. Provided that the relevant entries of the routing table are not stale, the selected MGW will typically provide a QoS sufficient for the requested MCS.

Figure 6:
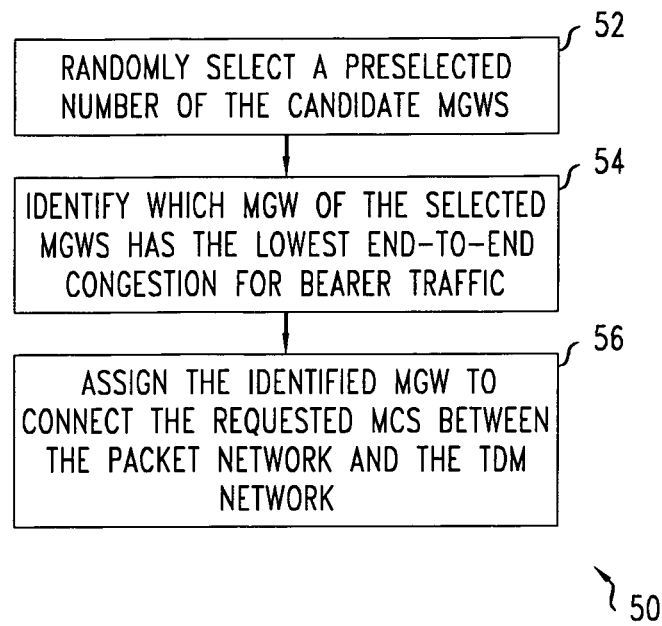
FIG. 6 is a flow chart illustrating a dynamical MCS routing process that can maintain a tendency to equalize end-to-end congestions for bearer traffic between a source node and a set of candidate MGWs even when routing table updates become less frequent.

Referring to FIG. 6, a third process 50 for selecting a MGW for the requested MCS tends to equalize end-to-end congestions between the source node and the MGWs of the set of candidate MGWs. The process 50 includes randomly selecting a preselected number of the candidate MGWs (step 52). The preselected number may be two or may be a larger integer. The selection step 52 may use any of a variety of well-know algorithms for pseudo-randomly selecting the preselected number of objects from a collection of a fixed number of objects. The process 50 includes identifying the one of the selected MGWs that has the lowest end-to-end congestion for bearer traffic between itself and the source node (step 54). The selection step 54 involves, e.g., looking up a measured property representative of the end-to-end congestions of the selected MGWs in the routing table and identifying the one of the selected MGWs that has the smallest end-to-end congestion entry. The process 50 also includes assigning the identified one of the selected MGWs to connect the requested MCS between the packet network 12 and the destination TDM network 14 (step 56). The process 50 can still tend to equalize end-to-end congestions between the source node and the MGWs of the set of candidate MGWs even if the entries of the routing table are updated relatively infrequently.

Figure 7:
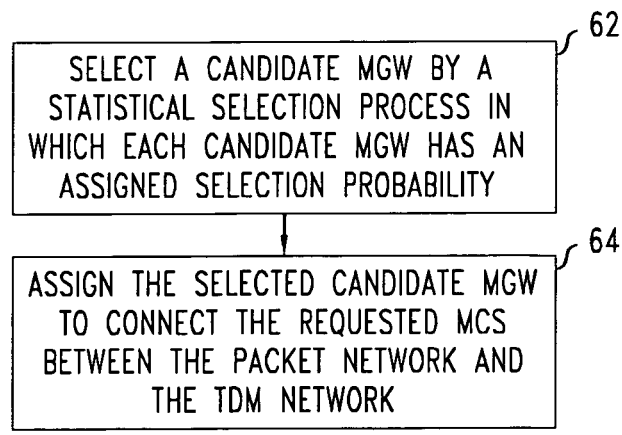
FIG. 7 is a flow chart illustrating a dynamical MCS routing process that tends to equalize end-to-end congestions for bearer traffic between a source node and a set of candidate MGWs over long time periods.

Referring to FIG. 7, a fourth process 60 for selecting a MGW to assign to the requested MCS tends to equalize bearer traffic end-to-end congestions between the source node and the MGWs of the set of the candidate MGWs while reducing oscillations in the end-to-end congestions between the source node and the various candidate MGWs. The process 60 includes selecting one of the candidate MGWs by a statistical selection process in which the k-th candidate MGW has an assigned probability q(k) of being selected (step 62). The set of assigned selection probabilities, {q(k)}, satisfy $\Sigma^{N}_{k=1} q(k)=1$, where "N" is the number of candidate MGWs. The process 60 also includes assigning the selected one of the candidate MGWs to provide the connection between the packet network 12 and the TDM network 14 for the MCS's bearer traffic (step 64). Over time, bearer traffic for the requested MCS is expected to gradually tend to equalize end-to-end congestions between the source node and the various candidate MGWs when the process 60 is used for routing decisions.

Figure 8:
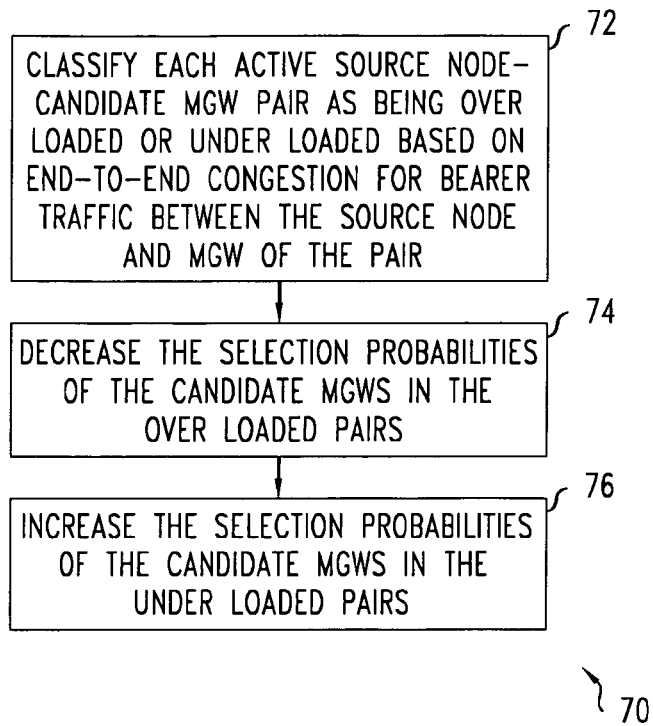
FIG. 8 is a flow chart illustrating a process for updating routing probabilities for use in the process of FIG. 7 such that the end-to-end congestions for bearer traffic typically tend to become equalized over long times.

Referring to FIG. 8, at each update of the routing table, the process 60 includes performing a process 70 that updates the assignments of the selection probabilities, i.e., q(j)'s, associated with the source node—candidate MGW pairs.

In the process 70, active pairs are distinguished from inactive pairs. A source node-candidate MGW pair, k, is active if its assigned selection probability q(k) is nonzero. Otherwise, the source node-candidate MGW pair is inactive. In the process 70, all pairs are initially active.

During an update, the process 70 includes making an inactive pair active if the pair has a mean end-to-end congestion for bearer traffic, D(k), that is less than κE[D]. Here, κ is a preselected number in the range (0, 1], and E[D] is the average of the end-to-end congestions over the active paths. The average may, e.g., be over pairs for which end-to-end congestions support the QoS requirement of the MCS. After the step that makes inactive pairs active, the process 70 includes updating E[D] to take into account newly active pairs.

The process 70 then classifies each active pair as either over loaded or under loaded based on the end-to-end congestion for bearer traffic between the pair's source node and MGW (step 72). The step 72 divides the active pairs between a group of under loaded pairs and a group of over loaded pairs. The under loaded pairs are, e.g., those active source node—candidate MGW pairs "r" over which bearer traffic has end-to-end congestions, i.e., D(r)'s, that are lower than E(D). The over loaded pairs are, e.g., those source node—candidate MGW pairs "s" over which bearer traffic has end-to-end congestions, i.e., D(s)'s, that are greater than or equal to E(D).

The updating process 70 includes decreasing the assigned selection probability of each candidate MGW that corresponds to an over loaded pair, i.e., each q(s) (step 74). Such "q(s)"s are decreased by the replacement q(s)←q(s)−ω(s). Here, ω(s) is the minimum of the original value of q(s) and [δ−(D(s)−E(D))/E(D)] for a suitably preselected value of the positive constant δ. If the above replacement makes the resulting probability q(s) less than a preselected positive small number ϵ, the process 70 also includes making the corresponding pair, s, inactive and includes making the adjustments ω(s)←ω(s)+q(s) and q(s)←0. After all over loaded pairs "s" have been considered, Ω is set to $\Sigma_s \omega(s)$.

The updating process 70 also includes increasing the assigned selection probability of each candidate MGW that corresponds to an under loaded pair, i.e., each q(r) (step 76). Such q(r)'s are increased by the replacement q(r)←q(r)+η(r). Here, η(r) is a positive number that may be defined by Ω·(E(D)−D(r))/[$\Sigma_{p=1 \ldots N}$(E(D)−D(p))] where the sum is over all active source node—candidate MGW pairs, p.

To compensate for round off errors, the process 70 may also include adjusting the selection probabilities to enforce $\Sigma_k q(k)=1$ after each update. Here, the sum is over all active source node—candidate MGW pairs, k.

Figure 9:
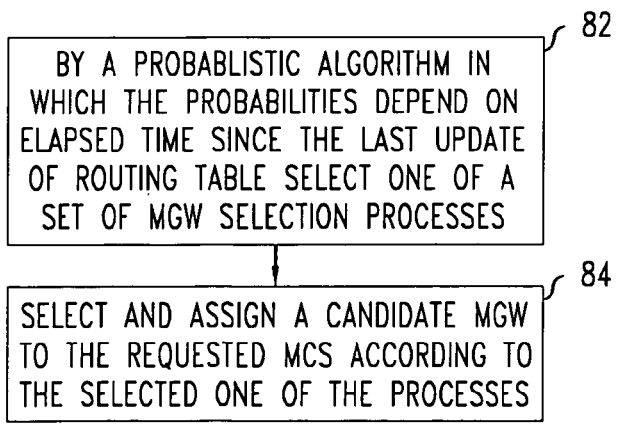
FIG. 9 is a flow chart illustrating a MCS routing process that dynamically selects between applying the routing process of FIG. 6 and applying the routing process of FIG. 7.

Referring to FIG. 9, a fifth process 80 for selecting and assigning a MGW to the requested MCS combines more than one of above processes 30, 40, 50, and 60 for selecting and assigning the MGW. The process 80 includes using a probabilistic algorithm to select one process for selecting and assigning a MGW from a fixed set of such processes (step 82). For example, the fixed set may include the process 50 of FIG. 6 and the process 60 of FIG. 7. In the probabilistic algorithm, the probability of selecting each process, e.g., process 30, 40, 50, or 60, depends on the elapsed time since the last update of the routing table. For example if the fixed set is formed of above described processes 50 and 60, the step 82 might select the process 50 with a probability of exp(−t/β) and select the process 60 with the probability [1−exp(−t/β)]. Here, "t" is the time that has elapsed since the last update of the routing table, and "β" is a preselected suitable positive constant. The process 80 includes then, performing the selection and assignment of a MGW according to selected one processes for selecting and assigning a MGW (step 84). The process 80 can reduce the greediness of MGW selection and assignment scheme, e.g., with respect to that of the process 50 when only a small number of candidate MGWs is available.

FIG. 10 schematically illustrates an exemplary architecture for the intelligent BGCF 90 of FIG. 1.

The exemplary intelligent BGCF includes a BGCF application 90 with a related SIP core. The BGCF application 90 is, e.g., responsible for processing SIP INVITE requests from the S-CSCF, e.g., requests to set up a new VoIP call. The BGCF application is layered over the SIP core. The SIP core receives SIP messages, processes SIP transactions, and provides proxy services. The BGCF application 90 is notified by the proxy layer of the SIP core in response to each arrival of a SIP INVITE request. The BGCF relies on a routing table, which is located in a route database 94, to select MGWs for assignment to the requested MCSs, e.g., as described in the methods 20A-20B of FIGS. 3A-3B. The BGCF makes route lookups in the routing table to produce a target set to return to the SIP core. Each target set is a list of SIP URLs of MGCFs for corresponding MGWs. The BGCF does not typically know actual IP addresses of the selected MGWs or MGCFs. The SIP core serially forwards SIP INVITE messages to each MGCF in the target set until one of the MGCFs accepts the SIP INVITE.

The exemplary intelligent BGCF also includes a route database 92, which has a routing table, e.g., the routing table 16 of FIG. 2. The routing database 92 may allow external additions of new route entries into the routing table.

The intelligent BGCF also includes measurement server 94. The measurement server 94 may be the platform for the above-described intelligent routing processes. The measurement server 94 uses measurements on bearer traffic of the IP and/or MPLS packet network to update entries in the routing table. The measurements of bearer traffic levels may obtained from probe collectors or from local aggregators of the IP and/or MPLS core data architecture. The measurement server 94 may be layered on top of an application framework that provides timer, socket and event loop management, and an embedded web server. The web server may upload or download data and monitor or configure the measurement server 94 based on an authentication scheme. The measurement server 94 typically has a measurement application interface (API) for communicating with the IP and/or MPLS measurement infrastructure. The measurement API may, e.g., retrieve a path QoS matrix that provides current measured QoSs between ingress and egress nodes of the IP/MPLS architecture. A common measurement API can enable the measurement server to interact with different types of IP and/or MPLS measurement systems.

From the above disclosure, the figures, and the claims, other embodiments will be apparent to those of skill in the art.

What we claim is:

1. A method, comprising:
   selecting one of a plurality of candidate gateways to connect a multimedia communication session between a packet network and a time-division multiplexed network, the packet network having a source or ingress node for the multimedia communication session, the time-division multiplexed network having a destination of the multimedia communication session, the candidate gateways interconnecting the packet network and the time-division multiplexed network; and
   wherein the selecting step, performed by a server or a router, includes comparing end-to-end congestions for bearer traffic between the source node and different candidate gateways of the plurality, randomly or pseudo-randomly choosing a proper subset of the candidate gateways and selecting from the proper subset that one of the candidate gateways for which the end-to-end congestion for bearer traffic with the source node is lowest.

2. The method of claim 1, wherein the time-division multiplexed network is a public switched telephone network and the packet network is an MPLS network.

3. The method of claim 1, wherein the selecting step includes comparing end-to-end congestions for bearer traffic between the source node and ports of the different candidate gateways.

4. The method of claim 3, wherein the selecting step further includes measuring properties representing the end-to-end congestions for bearer traffic between addresses of the source node and the ports, the measurable properties selected from the group consisting of:
   end-to-end packet delay for transmissions between the two addresses,
   roundtrip packet delay for transmissions between the two addresses,
   packet loss rate for transmissions between the two addresses,
   packet delay jitter for transmissions between the two addresses, and averages of any of the above measurable properties.

5. The method of claim 3, wherein the selecting step is performed by a border gateway control function of the IP multimedia subsystem.

6. The method of claim 1, wherein the selecting step includes admitting a multimedia communication session in response to determining that an end-to-end congestion between the source node and one or more of the candidate gateways is below a preselected threshold for a quality of service required by the multimedia communication session.

7. The method of claim 6, wherein the multimedia communication session is a voice over IP call.

8. The method of claim 1, wherein the selecting further comprises:
   searching entries of a routing table, each entry providing the end-to-end congestion between the source node and a candidate gateway corresponding to each entry.

9. The method of claim 1, wherein the selecting step does not include comparing traffic between the different candidate gateways and the destination.

10. The method as recited in claim 1 wherein the proper subset of candidate gateways is a preselected number of the candidate gateways.

11. A method, comprising:
   selecting and assigning one of a plurality of candidate media gateways to connect a requested multimedia communication session between a packet network and a time-division multiplexed network, the packet network having a source node for the multimedia communication session and supporting an IP multimedia subsystem, the time-division multiplexed network having a destination of the multimedia communication session, the candidate media gateways interconnecting the packet network and the time-division multiplexed network; and
   wherein the selecting and assigning are performed by a server or a router and the selecting step includes comparing an end-to-end congestion for bearer traffic between the source node and a first of the candidate gateways to an end-to-end congestion for bearer packet traffic between the source node and a second of the candidate gateways, randomly or pseudo-randomly choosing a proper subset of the candidate gateways and selecting from the proper subset that one of the candidate gateways for which the end-to-end congestion for bearer traffic with the source node is lowest.

12. The method of claim 11, wherein the multimedia communication session is a voice over IP call.

13. The method of claim 11, wherein the selecting step includes admitting a multimedia communication session in response to determining that an end-to-end congestion between the source node and one or more candidate gateways is below a preselected threshold for a quality of service required by the multimedia communication session.

14. The method of claim 13, wherein the multimedia communication session is a voice over IP call.

15. The method of claim 11, wherein the selecting further comprises:
searching entries of a routing table, each entry providing the end-to-end congestion between the source node and a candidate gateway corresponding the each entry.

16. The method of claim 11, wherein the selecting step does not include comparing traffic between the first or second candidate gateways and the destination.

17. A server or router storing a machine executable program of instructions to perform steps of a method, the steps comprising:
selecting one of a plurality of candidate media gateways to connect a requested VoIP call between a packet network and a time-division multiplexed network, the packet network having a source node for the VoIP call, the time-division multiplexed network having a destination of the VoIP call, the candidate media gateways interconnecting the packet network and the time-division multiplexed network; and
wherein the selecting step includes comparing end-to-end congestions for bearer traffic between the source node and first and second of the candidate gateways of the plurality, randomly or pseudo-randomly choosing a proper subset of the candidate gateways and selecting from the proper subset that one of the candidate gateways for which the end-to-end congestion for bearer traffic with the source node is lowest; and
wherein the server or router is located in the packet network and supports SIP.

18. The server or router of claim 17, wherein the instructions for performing the step of selecting include instructions for admitting the requested VoIP in response to determining that an end-to-end congestion between the source node and one or more candidate gateways is below a preselected threshold for a quality-of-service required by the VoIP call.

19. The server or router of claim 17, wherein the steps for the selecting further comprises searching entries of a routing table, each entry providing the end-to-end congestion between the source node and a candidate gateway corresponding the each entries.

20. The server or router of claim 17, wherein the proper subset of candidate gateways is a preselected number of the candidate gateways.

* * * * *